US011518249B2

(12) United States Patent
Kobayashi et al.

(10) Patent No.: US 11,518,249 B2
(45) Date of Patent: Dec. 6, 2022

(54) APPLYING BRAKING FORCE DURING SHIFTING EVENTS INVOLVING SWITCH-BACK STATE FOR A VEHICLE

(71) Applicant: HONDA MOTOR CO., LTD., Tokyo (JP)

(72) Inventors: Shinya Kobayashi, Wako (JP); Hisanori Yanagida, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 274 days.

(21) Appl. No.: 16/906,372

(22) Filed: Jun. 19, 2020

(65) Prior Publication Data

US 2020/0398674 A1 Dec. 24, 2020

(30) Foreign Application Priority Data

Jun. 24, 2019 (JP) ............................ JP2019-116776

(51) Int. Cl.
*B60L 7/26* (2006.01)
*B60L 7/10* (2006.01)
(Continued)

(52) U.S. Cl.
CPC ............... *B60L 7/10* (2013.01); *B60W 10/04* (2013.01); *B60W 10/10* (2013.01); *B60W 10/18* (2013.01); *B60W 30/18009* (2013.01); *B60L 7/26* (2013.01); *B60W 30/18127* (2013.01); *B60W 2540/10* (2013.01); *B60W 2540/12* (2013.01)

(58) Field of Classification Search
CPC ........ B60L 7/26; B60L 7/10; B60L 2240/423; B60W 30/18127; B60W 30/18009; B60W 10/04; B60W 10/10; B60W 10/18; B60W 2540/10; B60W 2540/12
See application file for complete search history.

(56) References Cited

U.S. PATENT DOCUMENTS

| | | | | |
|---|---|---|---|---|
| 5,492,192 A * | 2/1996 | Brooks | ................ | B60T 8/4863 701/84 |
| 6,126,251 A * | 10/2000 | Yoshii | ................ | B60W 10/184 303/152 |

(Continued)

FOREIGN PATENT DOCUMENTS

| | | |
|---|---|---|
| JP | 2016-016801 A | 2/2016 |
| JP | 2016-037225 A | 3/2016 |

*Primary Examiner* — Gonzalo Laguarda
(74) *Attorney, Agent, or Firm* — Rankin, Hill & Clark LLP

(57) ABSTRACT

A vehicle running control device that is provided with an accelerating-decelerating operation element with an operation range inclusive of a driving range and a braking range includes the following. An input-output section that receives various information including information on a direction in which the vehicle is currently running, a determining section that determines whether the vehicle is in a switch-back state, and an acceleration-deceleration control section that controls the vehicle running. When a braking-driving request value for an operation of the accelerating-decelerating operation element is in the braking range and the determining section determines that the vehicle is in the switch-back state, the acceleration-deceleration control section keeps the braking-driving force at a braking-driving force that is applied to the vehicle when a shift range switch request is accepted.

5 Claims, 8 Drawing Sheets

(51) Int. Cl.

| | |
|---|---|
| ***B60W 10/04*** | (2006.01) |
| ***B60W 10/18*** | (2012.01) |
| ***B60W 30/18*** | (2012.01) |
| ***B60W 10/10*** | (2012.01) |

(56) References Cited

U.S. PATENT DOCUMENTS

| | | | | |
|---|---|---|---|---|
| 8,066,339 | B2 * | 11/2011 | Crombez | B60T 8/00 303/152 |
| 9,610,953 | B2 * | 4/2017 | Huh | B60K 6/48 |
| 9,630,508 | B2 * | 4/2017 | Gabor | B60L 7/12 |
| 9,855,936 | B2 * | 1/2018 | Bousamra | B60T 8/17 |

* cited by examiner

APPLYING BRAKING FORCE DURING SHIFTING EVENTS INVOLVING SWITCH-BACK STATE FOR A VEHICLE

TECHNICAL FIELD OF THE INVENTION

The present invention relates to a vehicle running control device provided with an accelerating-decelerating operation element which a driver of a vehicle operates to input an acceleration-deceleration request including an acceleration request or a deceleration request.

BACKGROUND ART

JP2016-016801A discloses an invention of a vehicle running control device provided with an accelerating-decelerating operation element which a driver of a vehicle operates to input an acceleration-deceleration request including an acceleration request or a deceleration request. The vehicle running control device of JP2016-016801A comprises the accelerating-decelerating operation element (which corresponds to an accelerator pedal that enables both an acceleration operation and a decelerating operation) in addition to a braking operation element (brake pedal).

Since the vehicle running control device of JP2016-016801A enables a driver of a vehicle to directly input driver's intention (the acceleration-deceleration request) through the accelerating-decelerating operation element, the vehicle running control device is expected to create an effect of having the driver enjoy driving through a simple driving operation.

In addition, JP2016-037225A discloses an invention of a vehicle braking system that is used for an electrically driven vehicle such as an electric vehicle or a hybrid vehicle and is provided with a technical means to quickly cancel, so-called, a switch-back state of the vehicle when the vehicle is in the switch-back state (See paragraph 0027 of JP2016-037225A).

The switch-back state refers to an inconsistent state of the vehicle in which there is a discrepancy between a driving direction of the vehicle in accordance with a shift position of a shift lever (select lever) and a running direction of the vehicle in which the vehicle is actually running. To be specific, there are driving modes for the vehicle in which the vehicle is in the switch-back state. One is a driving mode in which the vehicle is running rearward with the shift lever positioned at a frontward driving position, and the other is a driving mode in which the vehicle is running frontward with the shift lever positioned at a rearward driving position.

The vehicle braking system of JP2016-037225A is configured to have a regenerative braking force control section instruct a friction braking force control section to provide a friction braking force that complements a shortage of a regenerative braking force, when a battery to collect regenerative electric power is fully charged. As a result, the friction braking force complements the shortage of the regenerative braking force. The friction braking force control section sets an upper limit value of the friction braking force to be generated for this operation, The upper limit value of the friction braking force is set to a first value when there is no tire slipping with a vehicle being not in the switch-back state and to a second value that is higher than the first value to cancel the inconsistent state caused by the switch-back state when the vehicle is in the switch-back state.

The vehicle braking system of JP2016-037225A enables providing the friction braking force that is needed to complement the shortage of the regenerative braking force and preventing the friction braking force larger than needed from being generated.

SUMMARY OF THE INVENTION

Suppose, the vehicle running control device disclosed in JP2016-016801A "comprising an accelerating-decelerating operation element which an driver of a vehicle operates to input any of an acceleration request and a deceleration request" is combined with the vehicle braking system disclosed in JP2016-037225A "being configured to cancel the switch-back state of a vehicle by setting the upper limit value of the friction braking force complementing the shortage of the regenerative braking force to a higher value in case the vehicle is in the switch-back state when the operation to complement the shortage of the regenerative braking force with the friction braking force is being carried out, and this combined braking system for the vehicle is in operation.

Looking to this combined braking system in operation, the person skilled in the art would conceive a configuration of setting the upper value of the friction braking force to complement the shortage of regenerative braking force to a higher value when the vehicle, which has the vehicle running control device provided with the acceleration-deceleration element (accelerator pedal) set in the single pedal mode which enables both accelerating and decelerating operations with a single pedal, is in the switch-back state.

However, it has not been taken into consideration that when a vehicle provided with the vehicle running control device as assumed above and an accelerating-decelerating operation element (accelerator pedal) that can work in the single pedal mode is in the switch-back state, the vehicle could be in an inconsistent state where how far down the accelerating-decelerating operation element (accelerator pedal) is depressed does not match a deceleration generated by the depressing operation on the accelerator pedal. How this inconsistent state is cancelled has not been considered so far.

As a result, when the vehicle is in the switch-back state, the vehicle can be in an inconsistent state in which an amount by which the accelerating-decelerating operation element (accelerator pedal) is depressed down does not match the deceleration generated by the depressing operation on the accelerator pedal. Then, the driver feels odd with the vehicle if this inconsistent state is not cancelled, which has been a problem The present invention has been created to solve the problem above mentioned and is intended to provide a vehicle running control device that enables a driver to feel that the vehicle naturally accelerates and decelerates without having the driver feel odd with the vehicle if the vehicle, which has a vehicle running control device provided with an accelerating-decelerating operation element in the single pedal mode, comes into the switch-back state.

In order to achieve the objective above mentioned, the present invention provides a vehicle running control device having a main feature of being provided with an accelerating-decelerating operation element that a driver operates when the driver inputs an acceleration-deceleration request to a vehicle inclusive of a driving request and a braking request, and has an operation range inclusive of a driving range and a braking range and comprising a processor including an information receiving section receiving information on a current running direction in which the vehicle is currently running, information on a shift range switch request for switching a driving direction of the vehicle between frontward driving and rearward driving, and information on a braking-driving force applied to the vehicle, a determining section determining whether the vehicle is in a switch-back state based on the current running direction of the vehicle and the target driving direction in accordance with the information on the shift range switch request and a running control section controlling the vehicle running by applying a braking-driving force to the vehicle, wherein the running control section keeps the braking-driving force applied to the vehicle at a first braking-driving force that is applied to the vehicle when the shift range switch request is accepted, until the vehicle stops, if a braking-driving request value for an operation of the accelerating-decelerating operation element is in the braking range when the determining section determines that the vehicle is in the switch-back state.

The vehicle running control device of the present invention can drive a vehicle, which is provided with an accelerating-decelerating operation element for a single pedal mode, not having a driver feel odd with the vehicle and having the driver feel that the vehicle accelerates and decelerates naturally, even when the vehicle comes into the switch-back state.

DETAILED DESCRIPTION OF THE INVENTION

Figure 1:
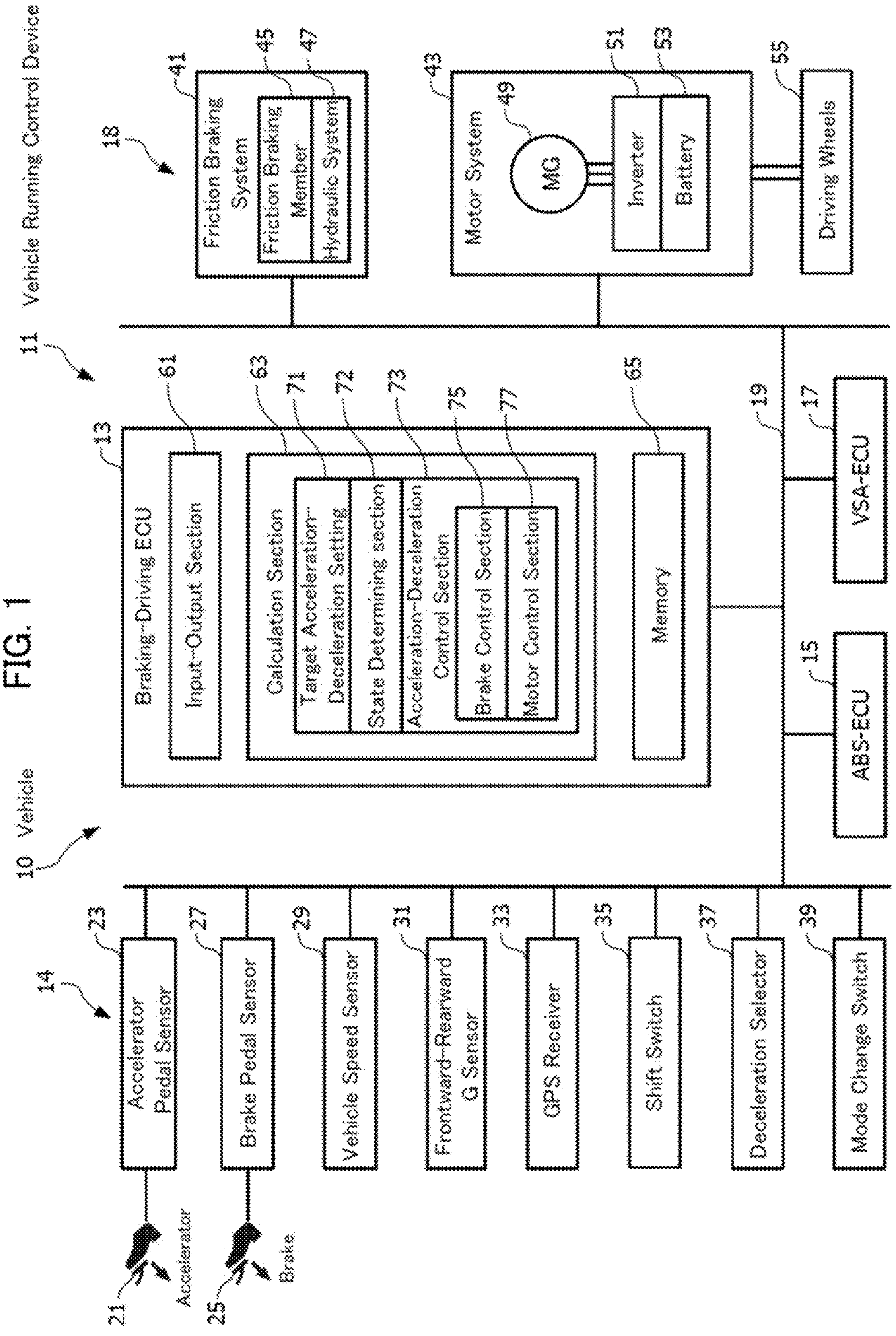
FIG. 1 is a schematic block diagram representing a vehicle running control device of an embodiment of the present invention.

The vehicle running control device of an embodiment of the present invention is described in detail with reference to the drawings.

In the drawings attached, a common reference sign is given to plural members that have a function in common or functions corresponding to each other in principle. For the sake of the explanation, some characterizing line figures are schematically described with modification or exaggeration.

<General Configuration of a Vehicle Running Control Device 11 of an Embodiment of the Present Invention>

Figure 2A:
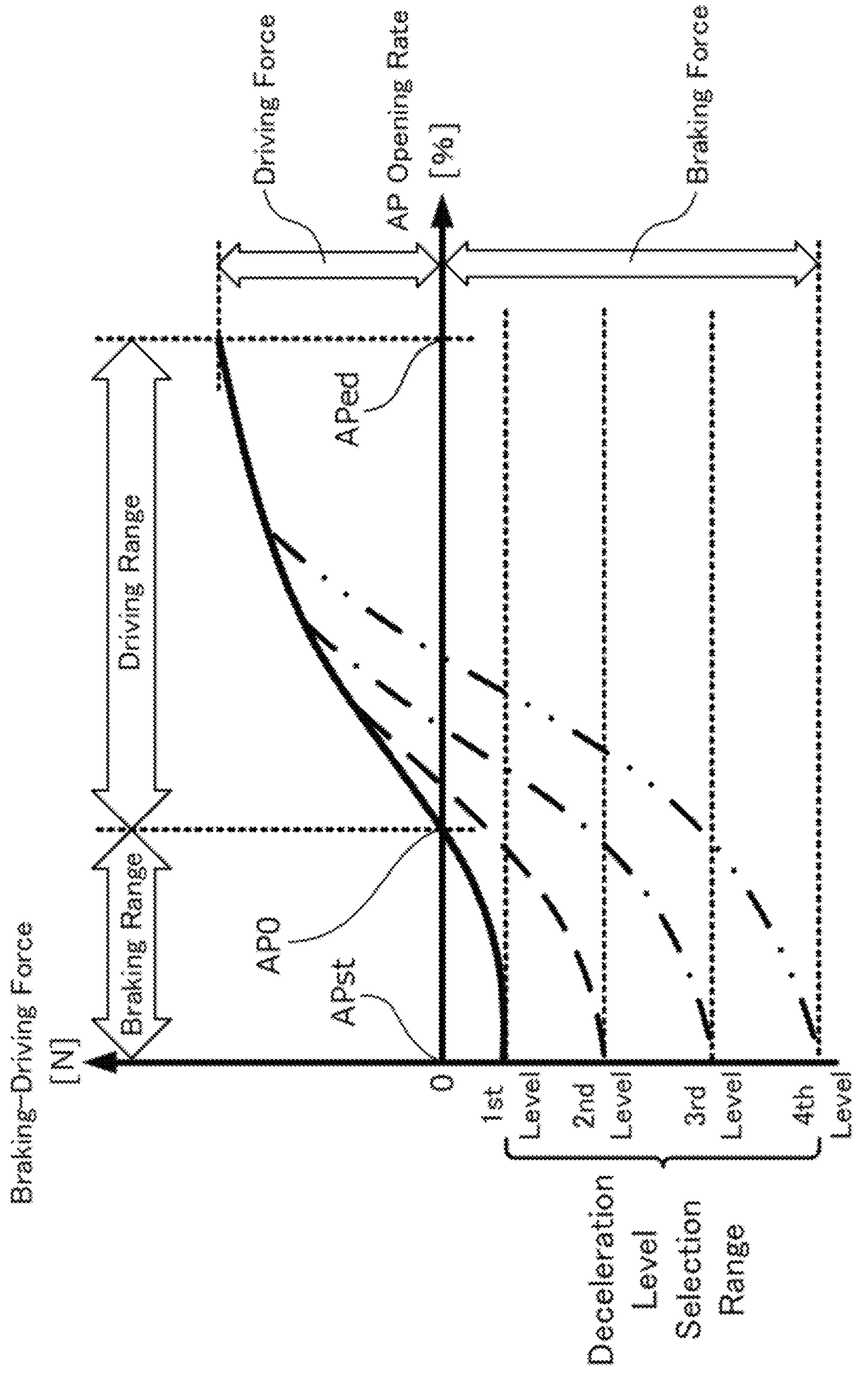
FIG. 2A is an explanation figure for explaining an operation of the vehicle running control device.

A vehicle running control device 11, which is installed in a vehicle 10 with a motor-generator 49 that is an electric vehicle, is described with reference to FIG. 1 and FIG. 2A. FIG. 1 is a schematic block diagram of the vehicle driving device 11. FIG. 2A is a figure for explaining an operation of the vehicle running control device 11.

As shown in FIG. 1, the vehicle running control device 11 includes an acceleration-deceleration ECU (Electronic Control Unit) 13, an input group 14, an ABS-ECU 15, a VSA-ECU 17 and an output group 18, all of which are connected with one another through a communication medium 19 such as CAN (Control Area network) so that information is sent and received between them.

Each of the acceleration-deceleration ECU 13, the ABS-ECU 15 and the VSA-ECU 17 ("VSA" is a registered trademark) is constituted by a microcomputer inclusive of a CPU (Central Processing Unit), ROM (Read Only Memory) and RAM (Random Access Memory). The microcomputer is configured to perform an operation to load and execute a program and information that are stored in ROM to perform a function of each of the acceleration-deceleration ECU 13, the ABS-ECU 15 and the VSA-ECU 17.

The acceleration-deceleration ECU (Electronic Control Unit) 13 has a function of controlling both an acceleration and a deceleration of the vehicle 10. An internal configuration of the acceleration-deceleration ECU 13 is described in detail later. The ABS-ECU 15 has a function of preventing a wheel from being locked when a braking operation is performed. The VSA-ECU 17 ("VSA" is a registered trademark) has a function of helping stabilize the vehicle 10 that is running.

The communication medium 19 as shown in FIG. 1 is connected to an accelerator pedal sensor 23, a brake pedal sensor 27, a vehicle speed sensor 29, a frontward-rearward G sensor 31, a GPS receiver 33, shift switch 35, a deceleration level selector 37 and a mode change switch 39, which are included in the input group 14.

The accelerator pedal sensor 23 is configured to detect whether the accelerator pedal 21 is depressed (whether acceleration operation is performed) and detect an amount of a depressing operation on an accelerator pedal 21 (how far down the accelerator pedal 21 is depressed) from an initial position (a position of the accelerator pedal 21 at which the accelerator pedal is not depressed by a driver). Information on whether the acceleration operation is performed and information on the amount of the depressing operation on the accelerator pedal (information on AP accelerating-decelerating operation amount), both of which are detected by the accelerator pedal sensor 23, are sent to the acceleration-deceleration ECU 13, the ABS-ECU 15 and the VSA-ECU 17 through the communication medium 19. The accelerator pedal 21 corresponds to an "acceleration-deceleration element" of the present invention.

The brake pedal sensor 27 is configured to detect whether a brake pedal 25 is depressed (whether a deceleration operation is performed) when the vehicle 10 is braking and detect an amount of a depressing operation on a brake pedal (how far down the brake pedal 25 is depressed) from an initial position (a position of the brake pedal at which the brake pedal is not depressed by a driver). Information on whether the braking operation is performed and information on the amount of the depressing operation on the brake pedal, both of which are detected by the brake pedal sensor 23, are sent to the acceleration-deceleration ECU 13, the ABS-ECU 15 and the VSA-ECU 17 through the communication medium 19. The brake pedal 25 corresponds to a "braking element" in the present invention.

A vehicle speed sensor 29 has a function of detecting a speed (vehicle speed) of the vehicle 10. Information on the vehicle speed detected by the vehicle speed sensor 29 is sent to the acceleration-deceleration ECU 13, the ABS-ECU 15 and the VSA-ECU 17 through the communication medium 19.

The frontward-rearward G sensor 31 has a function of detecting an acceleration and a deceleration on the vehicle 10 in a front-rear direction of the vehicle 10. Information on the acceleration and the deceleration in the front-rear direction detected by the frontward-rearward G sensor 31 is sent to the acceleration-deceleration ECU 13, the ABS-ECU 15 and the VSA-ECU 17 through the communication medium 19.

The GPS receiver 33 has a function of detecting information on a current position of the vehicle 10 inclusive of information on a current running direction in which the vehicle 10 is running based on an electrical wave received from a GPS satellite. The information on the current running direction in which the vehicle 10 is running detected by the GPS receiver 33 is sent to the acceleration-deceleration ECU 13, the ABS-ECU 15 and the VSA-ECU 17 through the communication medium 19.

The shift switch 35 is a switch to be operated when a running direction of the vehicle 10, which is either a frontward direction or a rearward direction, is switched. The shift switch 35 is fitted at a center console portion (not shown) of the vehicle 10. Information on the shift position selected by a driver (Drive range (D range) or Reverse range (R range)) is sent to the acceleration-deceleration ECU 13 through the communication medium 19.

The deceleration level selector 37 is configured to select and set a deceleration level (based on the regenerative braking force with the motor-generator 49) to be applied to the vehicle 10 and is fitted on a spoke of a steering wheel (not shown).

The deceleration level selector 37 of the present embodiment has, for example, four deceleration levels in the deceleration selection range, as shown in FIG. 2A. Information on the deceleration level set by the deceleration level selector 37 is sent to the acceleration-deceleration ECU 13, the ABS-ECU 15 and the VSA-ECU 17 through the communication medium 19.

The mode change switch 39 is a switch to be operated when an operation mode (referred to as "AP operation mode" hereinafter) of the accelerator pedal 21 is switched. The mode change switch 39 is fitted, for example, on an instrument panel (not shown) in the vehicle compartment.

There are two alternative modes to which the AP operation mode can be set. One is an ordinary mode in which only the acceleration in accordance with the amount of the depressing operation on the accelerator pedal 21 is applied to the vehicle 10. The other is a single pedal mode in which the acceleration or the deceleration in accordance with the amount of the depressing operation or a releasing-back operation on the accelerator pedal 21 is applied to the vehicle 10. The single pedal mode is detailed later.

The mode change switch 39 may be set to the single pedal mode by default, which saves the driver an operation to switch to the single pedal mode.

In addition, the communication medium 19 is connected to both a braking system 41 and a motor system 43 which are included in an output group 18, as shown in FIG. 1.

The braking system 41 consists of elements for friction braking such as a friction brake member 45 inclusive of a brake pad and a disk rotor and a hydraulic system 47. The braking system 41 has a function of generating a friction braking force to be applied to wheels of the vehicle 10 in accordance with an instruction by the acceleration-deceleration ECU 13.

The motor system 43 includes a motor-generator 49, an inverter 51 to drive the motor-generator 49 and a battery 53 to supply electric power to the motor-generator 49 through the inverter 51.

The motor system 43 is connected with driving wheels 57 through a power transmission device that is not shown. The motor system 43 is given an instruction from the acceleration-deceleration ECU 13 to drive the vehicle 10 or perform the regenerative braking when it is necessary to do so.

<Internal Configuration of Acceleration-Deceleration ECU 13>

Next, an internal configuration of the acceleration-deceleration ECU 13 is described with reference to FIG. 1.

As shown in FIG. 1, the acceleration-deceleration ECU 13 comprises an input-output section 61, a calculation section 63 and a memory 65.

The input-output section 61 has a function to receive inputted information including information detected by the accelerator pedal sensor 23 on whether the acceleration operation is performed, information detected by the accelerator pedal sensor 23 on the amount of the accelerating or deceleration operation (information on AP accelerating-decelerating operation amount), information detected by the brake pedal sensor 27 on whether the deceleration operation is performed, information detected by the brake pedal sensor 27 on an amount of the braking operation with the accelerator pedal 23 (information on BP braking operation amount), vehicle speed information detected by the vehicle speed sensor 29, frontward-rearward G information detected by the frontward-rearward G sensor 31, information detected by the GPS receiver 33 on the current running direction, shift position information detected by the shift switch 35 (target driving direction information), deceleration level information detected by the deceleration level selector 37 and mode switch information detected by the mode change switch 39, and to receive and output input-output information including information on friction braking instruction for the friction braking system 41 and both braking control information and driving control information on the motor-generator 49.

The input-output section 61 corresponds to "information receiving section" of the present invention.

The calculation section 63 has a function to calculate information as on controlling deceleration with the friction brake member 45 and information on controlling acceleration and deceleration through the motor-generator 49 based on information on whether the acceleration operation is performed, information on AP accelerating-decelerating operation amount, information on whether the deceleration operation is performed, information on a BP braking operation amount, vehicle speed information, frontward-rearward G information, information on the current running direction, shift position information (target driving direction information), deceleration level information, mode switch information and the like. In addition, the calculation section 63 has a function to determine if the vehicle 10 is in the switch-back state based on a current running direction of the vehicle 10 from the information on the current running direction and a target driving direction in accordance with the shift range switch request.

To be specific, the calculation section 63 includes a target acceleration-deceleration setting section 71, a state determining section 72 and an acceleration-deceleration control section 73.

The target acceleration-deceleration setting section 71 has a function to set a target value for the acceleration-deceleration of the vehicle 10 (referred to as "target acceleration-deceleration value" as well hereinafter) based on the inputted information on the AP accelerating-decelerating operation amount, the BP braking operation amount and the like.

To be more specific, when the AP operation mode is set to the ordinary mode, the target acceleration-deceleration setting section 71 sets the target acceleration based on the AP accelerating-decelerating operation amount information while setting the target deceleration based on the BP braking operation amount information. Accordingly, only the acceleration of the vehicle 10 is controlled in accordance with the AP accelerating-decelerating operation amount information in the ordinary mode. As a result, the entire pedal stroke range for the acceleration pedal 21 being depressed and released back is used for acceleration on the vehicle 10 (entire range of possible AP acceleration-deceleration operation amount), in principle.

However, a regenerative brake (corresponding to an engine brake of a vehicle provided with an internal combustion engine) operates as normal when the accelerator pedal 21 is released back to around its initial position.

On the contrary, when the AP operation mode is set to the single pedal mode, the target acceleration-deceleration setting section 71 sets the deceleration (requested deceleration) based on the BP braking operation amount information in the same way as in the ordinary mode, and sets a target acceleration-deceleration (requested acceleration-deceleration) including a target acceleration (requested acceleration) and a target deceleration (requested deceleration) based on the AP accelerating-decelerating operation amount information, which is different from the operation in the ordinary mode.

With reference to FIG. 2A, a relation between the depressing operation amount on the accelerator pedal 21 (AP accelerating-decelerating operation amount information: AP opening rate) and the requested acceleration-deceleration (requested braking-driving force) that is dependent on the depressing operation amount on the accelerator pedal 21 is described. The lateral axis in FIG. 2A indicates the AP opening rate (unit: %) while the vertical axis in FIG. 2A indicates the acceleration-deceleration force (unit: N) including the braking force (deceleration force) and the driving force (acceleration force).

The deceleration selection range of the present embodiment to be selected by the deceleration level selector 37 includes, for example, four levels, as shown in FIG. 2A. The deceleration becomes larger in the increasing order of the four levels in the deceleration selection range (1st level<2nd level<3rd level<4th level).

As shown in FIG. 2A, dependence of the acceleration-deceleration force on the AP opening rate (AP accelerating-decelerating operation amount information) indicates an substantially upward sloping characteristic that means that the higher the AP opening rate, the larger the driving force (the smaller the braking force (the deceleration)). This dependence is the case with any of the four levels between the 1st level and the 4th level in the deceleration selection range being set for the vehicle 10.

The following description assumes that the AP operation mode is set to the single pedal mode in which the acceleration-deceleration is controlled in accordance with the depressing/releasing-back operation amount of the accelerator pedal 21, unless described otherwise. In addition, the deceleration level of the vehicle 10 is assumed to be set to the "first level" that corresponds to the smallest deceleration level in the deceleration selection range (1st level to 4th level) as shown in FIG. 2A The acceleration-deceleration that a driver intends to request is set through an operation of a single pedal (accelerator pedal 21). Then, the requested acceleration-deceleration (requested braking-driving force) in the braking range is dependent on the depressing operation amount of the acceleration pedal 21 (AP accelerating-decelerating operation amount information: AP opening rate) in a manner that the farther down the accelerator pedal 21 is depressed (the higher the AP opening rate), the smaller the requested deceleration (requested braking force) becomes, as seen in FIG. 2A.

In addition, the requested acceleration (requested driving force) in the driving range is dependent on the depressing operation amount of the acceleration pedal 21 (AP accelerating-decelerating operation amount information: AP opening rate) in a manner that the farther down the acceleration pedal 21 is depressed (the higher the AP opening rate), the larger the requested acceleration (requested driving force) becomes, as seen in FIG. 2A.

To understand correctly the vehicle running control device 11, terms used for describing the present invention are defined as follows.

To begin with, a "driving force" is a force applied by a driving torque transmitted from the motor-generator 49 to driving wheels (not shown) to drive the vehicle 10 frontward or rearward.

Then, a "braking force" is a force to decelerate the vehicle 10 to stop. There are two kinds of the braking force. One braking force is a friction braking force to utilize a friction resistance of a friction brake member 45 as a braking force to decelerate the vehicle 10. The other braking force is a regenerative braking force (that may be shortened to "regenerative force" below) to utilize a rotation resistance of the motor generator 49 that is working as a power generator generating power as a braking force to decelerate the vehicle 10.

In addition, the "braking range" is a range for braking (deceleration) in the entire pedal stroke range of the acceleration pedal 21 being depressed and released back (entire range of the possible AP opening rate) and extends from an initial value APst as an origin point that corresponds to an initial position of the accelerator pedal 21 to a boundary threshold value AP0 as a terminal point, as shown in FIG. 2A.

Furthermore, the "driving range" is a range for driving (acceleration) in the entire pedal stroke range of the acceleration pedal 21 being depressed and released back (entire range of the possible AP opening rate) and extends from the boundary threshold value AP0 as an origin point to a limit depressing value APed corresponding to a limit depressing position of the accelerator pedal 21, as shown in FIG. 2A.

A range width of each of the braking range and the driving range (how large a boundary threshold value AP0 is) can vary depending on, for example, which of the deceleration levels is taken from among the deceleration selection range (1st level to 4th level).

With reference again to FIG. 1, the internal configuration of the acceleration-deceleration ECU 13 is described.

The state determining section 72 has a function to determine whether the vehicle 10 is in the switch-back state or not based on the current running direction of the vehicle 10 from the current running direction information and the target driving direction in accordance with the shift range switch request generated by the shift switch 35. The acceleration-deceleration control section 73 checks a determined result outputted by the state determining section 72 on whether the vehicle 10 is in the switch-back state to determine whether the braking-driving force that is applied to the vehicle 10 when the shift range switch request is accepted should be kept applied to the vehicle 10 until the vehicle 10 stops.

The acceleration-deceleration control section 73 has a function to perform controlling the acceleration-deceleration of the vehicle 10 based on received information of the vehicle speed information, the frontward-rearward G information, the current running direction information, the shift position information and the like, determined result information outputted by the state determining section 72 on whether the vehicle 10 is in the switch-back state and information on the target acceleration-deceleration set by the target acceleration-deceleration setting section 71. The acceleration-deceleration control section 73 corresponds to a "running control section" of the present invention.

In order to cancel the switch-back state to have a driver feel that a vehicle accelerates and decelerates naturally without having the driver feel odd with the vehicle running, the acceleration-deceleration control section 73 is provided with a brake control section 75 and a motor control section 77.

The brake control section 75 is configured to control a braking operation with a braking mechanism 41 applying a friction braking force based on the target acceleration-deceleration set by the target acceleration-deceleration setting section 71. The motor control section 77 is configured to control the braking-driving operation with a motor mechanism 43 applying a driving force or a regenerative braking force through the motor generator 49 based on the target acceleration-deceleration set by the target acceleration-deceleration setting section 71.

A storage section 65 includes a non-volatile memory and a volatile memory, which are not shown. The non-volatile memory is, for example, a flash memory or an EEPROM (Electrically Erasable Programmable Read Only Memory), and stores programs with which various operations are carried out by the calculation section 63. The volatile memory is, for example, DRAM (Dynamic Random-Access Memory), and temporarily stores inputted and outputted information and calculated results when the calculation section 63 carries out various operations.

The storage section 65 stores a predetermined threshold vehicle speed value CS_th. The threshold vehicle speed value CS_th is read to determine whether a vehicle speed of the vehicle 10 lowers to a predetermined low vehicle speed value (threshold vehicle speed value CS_th) or not, when an operation to cancel the switch-back state is being performed with the AP operation mode set to the single pedal mode.

<Review of the Objective of the Vehicle Running Control Device 11 of the Embodiment of the Present Invention>

Figure 2B:
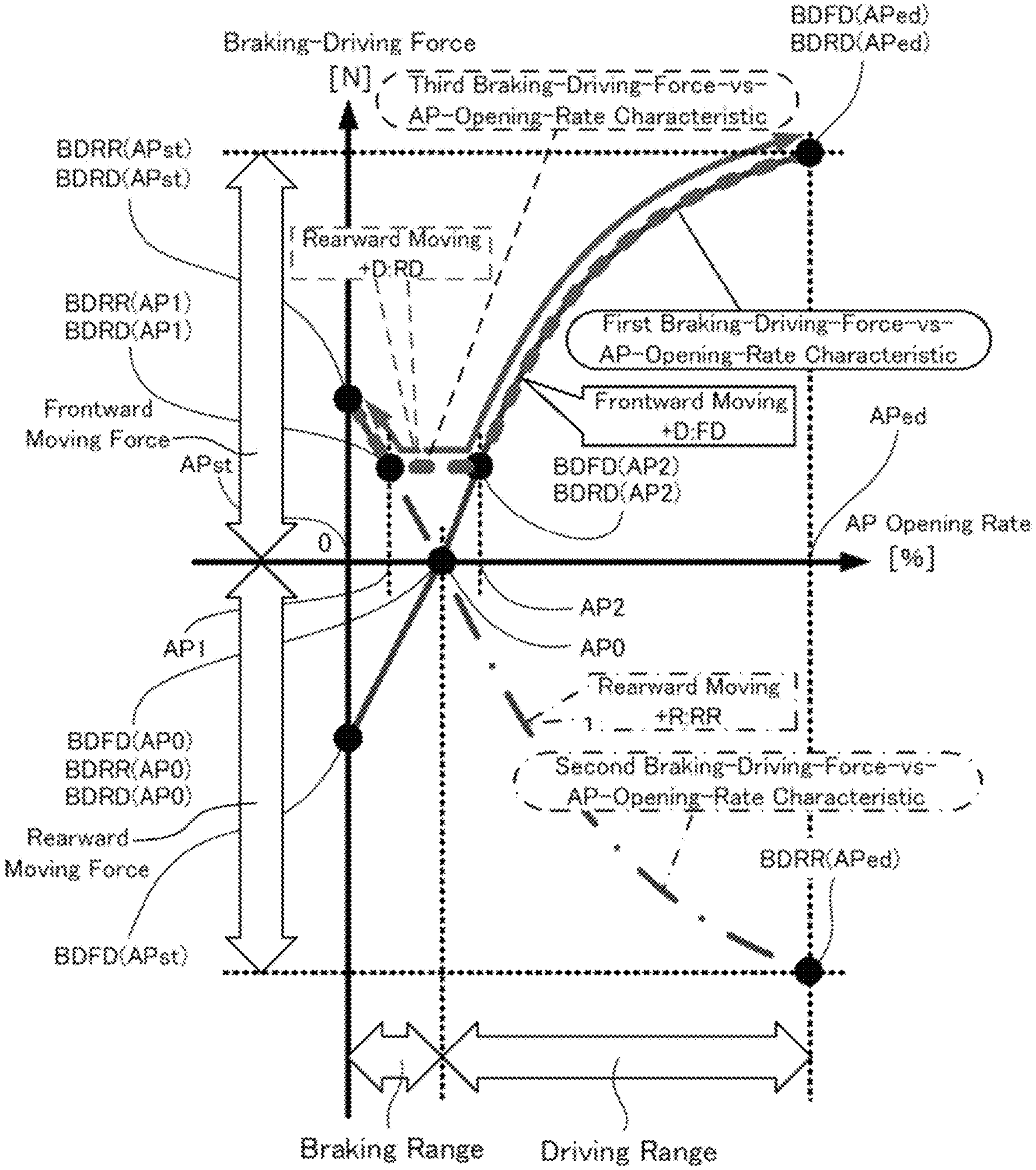
FIG. 2B is an explanation figure for explaining a problem and an operation of the vehicle running control device.

Here, the objective of the vehicle running control device 11 of the embodiment of the present invention is reviewed with reference to FIG. 2A and FIG. 2B. FIG. 2B is intended to describe the objective and the operation of the vehicle running control device 11.

FIG. 2B shows braking-driving-force-versus-AP-opening-rate characteristic lines when the AP operation mode is set to the single pedal mode and the shift position is set to a drive range (D range: frontward direction) or a reverse range (R range: rearward direction) with the deceleration level set to the first level by a shift switch 35, whose operation enables the shift to be switched to the D range and the R range.

When the AP operation mode is set to the single pedal mode (with the deceleration level set to the first level), the larger the AP opening rate (the larger the AP accelerating-decelerating operation amount), the larger the driving force becomes, while the smaller the AP opening rate (the smaller the AP accelerating-decelerating operation amount), the smaller the driving force (the larger the braking force) becomes, as shown in FIG. 2A and FIG. 2B.

Especially, when the braking-driving request value (AP opening rate) in accordance with an operation of the accelerator pedal 21 (that may be referred to as "AP operation") is in the braking range as indicated in FIG. 2A and FIG. 2B with the shift being positioned at the D range (for frontward running), the driving torque outputted by the motor generator 49 is applied in the reverse direction (rearward direction). In this case, if the vehicle 10 is on the flat ground with no braking force applied to the vehicle 10, the vehicle 10 would run rearward.

Therefore, when the braking-driving request value in accordance with the AP operation in the single pedal mode (with the deceleration level being the first level) is in the braking range as indicated in FIG. 2A and FIG. 2B with the shift being positioned at the D range (for frontward running), a friction braking force is applied to the vehicle 10 to prevent the vehicle 10 from running rearward and to keep the vehicle 10 stopped.

Here, in a case where the vehicle 10 is in the switch-back state (in which the vehicle 10 is running rearward with the shift positioned at the D range) with the braking-driving request value in accordance with the AP operation being in the braking range as shown in FIG. 2A and FIG. 2B when the AP operation mode is set to the single pedal mode (with the deceleration level set to the first level), there could be an inconsistent state in which an operation amount by which the accelerator pedal 21 is depressed (AP accelerating-decelerating operation amount) does not match the braking-driving force generated by the depressing operation.

This state is described in detail below.

There are a couple of normal running modes in which the vehicle 10 does not come into the switch-back state. One is a first normal running mode (frontward running and D range: FD) in which the vehicle 10 is running frontward with the shift being positioned at the D range (for frontward running). The other is a second normal running mode (rearward running and R range: RR) in which the vehicle 10 is running rearward with the shift being positioned at the R range (for rearward running).

Each of the first and second normal running modes shows a predetermined characteristic of the braking-driving force versus the AP opening rate. A first braking-driving-force-versus-AP-opening-rate characteristic for the first normal running mode (frontward and D range: FD) is represented by an upward sloping trace along a line extending through braking-driving force value points, BDFD(APst), BDFD(AP0), BDFD(AP2) and BDFD(APed), as shown in FIG. 2B. This means that any braking-driving force for a corresponding braking-driving request value (AP opening rate) generated by the AP operation in the first normal running mode (frontward running and D range: FD) is necessarily on the first braking-driving-force-versus-AP-opening-rate characteristic line (no deviation occurs).

On the other hand, a second braking-driving-force-versus-AP-opening rate characteristic line for the second normal running mode (rearward running and R range: FD) is represented by a downward sloping trace along a line extending through braking-driving force value points of BDRR(APst), BDRR(AP1), BDRR(AP0) and BDRR(APed), as shown in FIG. 2B. This means that any requested braking-driving value (braking-driving force commensurate with the AP opening rate) generated from the AP operation in the second normal running mode (rearward running and R range: RR) is necessarily on the second braking-driving-force-versus-AP-opening-rate characteristic line (no deviation occurs).

As shown in FIG. 2B, the first braking-driving-force-versus-AP-opening-rate characteristic line and the second braking-driving-force-versus-AP-opening-rate characteristic line intersect with each other at a point at which the AP opening rate is equal to AP0.

There are a couple of an abnormal running modes in which the vehicle 10 comes into the switch-back state. One is a first abnormal running mode (rearward running and D range: RD) in which the vehicle 10 is running rearward with the shift positioned at the D range (for frontward running). The other is a second abnormal running mode (frontward running and R range: FR) in which the vehicle 10 is running frontward with the shift positioned at the R range (for rearward running).

Hereinafter, how the vehicle 10 comes into the switch-back state is explained with reference to an example of the first abnormal running mode (rearward running and D range: RD).

Assuming that the AP opening rate is initially zero, a third braking-driving-force-versus-AP-opening-rate characteristic line traces a line forming roughly a V letter through braking-driving force points of BDRD(APst)-BDRD(AP1)-BDRD(AP0)-BDRD(AP2)-BDRD(APed), as shown in FIG. 2B.

To be specific, the third braking-driving-force-versus-AP-opening-rate characteristic line has a first path extending through braking-driving force points of BDRD(APst)-BDRD(AP1)-BDRD(AP0) and a second path continuing from the first path and extending through braking-driving force points of BDRD(AP0)-BDRD(AP2)-BDRD(APed). When a driver starts depressing down the accelerator pedal 21 (the AP accelerating-decelerating operation amount becomes larger), the braking-driving force (frontward driving force) for the braking-driving request value to be generated by driver's depressing operation, which the driver expects should become larger, becomes smaller along the first path.

Then, as the driver further depresses down the accelerator pedal 21 (the AP accelerating-decelerating operation amount becomes larger), the braking-driving force (frontward driving force) for the braking-driving request value from the depressing operation becomes larger along the second path continuing from the first path and extending through BDRD (AP0)-BDRD(AP2)-BDRD(APed) in the third braking-driving-force-versus-AP-opening-rate characteristic line.

As has been described, according to the third AP-opening rate-versus-braking-driving-force characteristic line for the first abnormal running mode (rearward running and D range: RD), as the driver starts depressing accelerator pedal 21 down, the braking-driving force (frontward driving force) for the braking-driving request value generated by the depressing operation decreases, which results in "deceleration mismatch". Then, when the depressing amount of the accelerator pedal 21 (AP accelerating-decelerating operation amount) further increases, the braking-driving force (frontward driving force) for the braking-driving request value generated by the depressing operation increases.

As a result, there happens an inconsistent state between the depressing amount of the accelerator pedal 21 and the braking-driving force for the braking-driving value generated by the depressing operation, which is caused by the "deceleration mismatch" phenomenon.

In order to prevent the "deceleration mismatch" to give a driver a natural acceleration or deceleration feeling without having the driver feel odd with a vehicle running even when the vehicle 10 is in the switch-back state, the vehicle running control device 11 of an embodiment of the present invention adopts a configuration with which the braking-driving force applied to the vehicle is kept at a braking-driving force BD_SR, which is applied to the vehicle 10 at a time when a shift range switch request (may be shortened to "SR switch request") is accepted, until the vehicle 10 stops, if the braking-driving request value is in the braking range when the vehicle 10 is in the switch-back state.

Suppose that the shift range switch request is accepted when the AP opening rate is AP1, in a case where the vehicle 10 comes into the switch-back state when the vehicle is in the first abnormal running mode (rearward running and D range: RD). In this case, the braking-driving request value (BFRD(AP1) based on the AP operation (for the AP opening rate AP1) is in the braking range (See FIG. 2B).

Therefore, the braking-driving force applied to the vehicle 10, which is indicated by a dotted line in FIG. 2B that is in parallel with the horizontal line for the AP opening rate, is kept at and not lower than the braking-driving force applied to the vehicle 10 at a time when the shift range switch request is accepted with the AP opening rate being AP1, until the vehicle 10 stops. As a result, the "deceleration mismatch" is prevented.

The vehicle running control device 11 of the embodiment of the present invention enables giving a driver a natural acceleration-deceleration feeling without having the driver feeling odd with the vehicle 10 running even when the vehicle 10 comes into the switch-back state.

<Operation Process of the Vehicle Running Control Device 11 of an Embodiment of the Present Invention>

Figure 3:
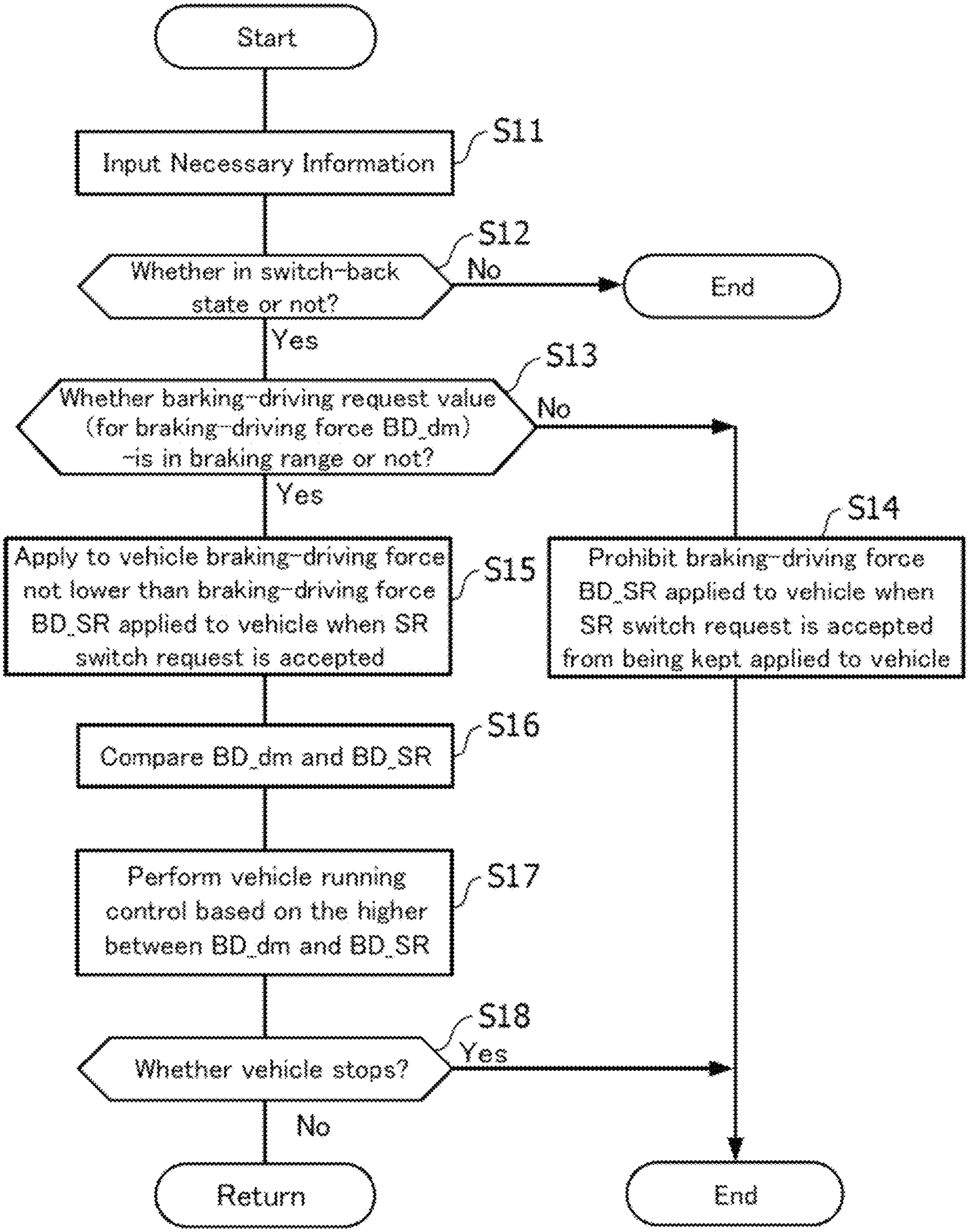
FIG. 3 is a flow-chart for describing an operation process of the vehicle running control device.

Next, the operation process of the vehicle running control device 11 of an embodiment of the present invention is described with reference to FIG. 3. FIG. 3 is a flow-chart for describing the operation process of the vehicle running control device 11.

Here, the AP operation mode is assumed to be set to the single pedal mode, and the deceleration level at the D range of the vehicle 10 is assumed to be set to "first level".

The process of steps S11 to S18 is performed in a predetermined cycle time and repeated.

In a step S11 as shown in FIG. 3, the input-output section 61 of the acceleration-deceleration ECU 13 receives through the communication medium 19 various inputted information such as the AP accelerating-decelerating operation amount information (AP opening rate), the BP braking operation amount information, the vehicle speed information, the frontward-rearward G information, the current running direction information from the GPS receiver 33, the shift position information from the shift switch 35 (target driving direction information), the information on the deceleration level set by the deceleration level selector 37 and the mode switch information.

In Step S12, the state determining section 72 included by the calculation section 63 of the acceleration-deceleration ECU 13 determines whether the vehicle 10 is in the switch-back state based on the current running direction in accordance with the current running direction information on the vehicle 10 and the target driving direction in accordance with the shift range switch request from the shift switch 35.

If Step S12 determines that the vehicle 10 is not in the switch-back state ("No" in Step S12), the acceleration-deceleration ECU 13 ends the operation processes.

If Step S12 determines that the vehicle 10 is in the switch-back state ("Yes" in Step S12), the acceleration-deceleration ECU 13 has the operation process go ahead to Step S13.

In Step S13, the acceleration-deceleration ECU 13 determines whether the braking-driving request value (function of AP opening rate) is in the braking range (See FIG. 2A and FIG. 2B).

If Step S13 determines that the braking-driving request value in accordance with the AP operation is not in the braking range ("No" in Step S13), the acceleration-deceleration ECU 13 has the operation process go ahead to Step S14.

On the other hand, if Step S13 determines that the braking-driving request value is in the braking range ("Yes" in Step S13), the acceleration-deceleration ECU 13 has the operation process go ahead to Step S15

In Step S14, the acceleration-deceleration control section 73 included by the calculation section 63 of the acceleration-deceleration ECU 13 prohibits the braking-driving force applied to the vehicle 10 from being kept at the braking-driving force BD_SR, which corresponds to the braking-driving force applied to the vehicle 10 at a time when the shift range switch request (SR switch request) is accepted and would be kept applied to the vehicle 10 if the braking-driving request value (for a braking-driving force BD_dm) in accordance with the AP operation were in the braking range ("No" in Step S13) with the vehicle 10 being in the switch-back state ("Yes" in Step S12). After Step S14 is finished, the acceleration-deceleration ECU 13 ends the operation process.

In Step S15, the acceleration-deceleration control section 73 keeps applying to the vehicle 10 the braking-driving force that is not lower than the braking-driving force BD_SR applied to the vehicle 10 at the time when the shift range switch request (SR switch request) is accepted, if the braking-driving request value (for the braking-driving force BD_dm) in accordance with the AP operation is in the braking range ("Yes" in Step S13) when the vehicle 10 is in the switch-back state ("Yes" in Step S12). After Step S15, the acceleration-deceleration ECU 13 has the operation process go ahead to Step S16.

In Step S16, the acceleration-deceleration ECU 13 compares the braking-driving force BD_SR, which is applied to the vehicle 10 at the time when the SR switch request is accepted, with the braking-driving force BD_dm in accordance with the braking-driving request value for the AP operation.

In Step S17, the acceleration-deceleration ECU 13 controls the vehicle 10 running based on a larger one of the braking-driving force BD_dm for the braking-driving request value in accordance with the AP operation and the braking-driving force BD_SR applied to the vehicle 10 at the time when the SR switch request is accepted.

After Step S17, the acceleration-deceleration ECU 13 has the process go ahead to Step S18.

In Step S18, the acceleration-deceleration ECU 13 determines whether the vehicle 10 stops.

When Step S18 determines that the vehicle 10 has stopped ("Yes" in Step S18), the acceleration-deceleration ECU 13 ends the operation process.

On the other hand, when Step S18 determines that the vehicle 10 has not stopped ("No" in Step S18), the acceleration-deceleration ECU 13 gets the process back to Step S11 and has the whole operation process performed again.

While the operation process from Step S12 (Yes) to Step S13 (Yes) is underway, the vehicle 10 is in the switch-back state and has the braking-driving request value (for the braking-driving force BD_dm, function of the AP opening rate including the AP opening rate itself) being within the braking range.

<Description of the Operation of the Vehicle Running Control Device 11 Based on a Time Chart>

Figure 4:
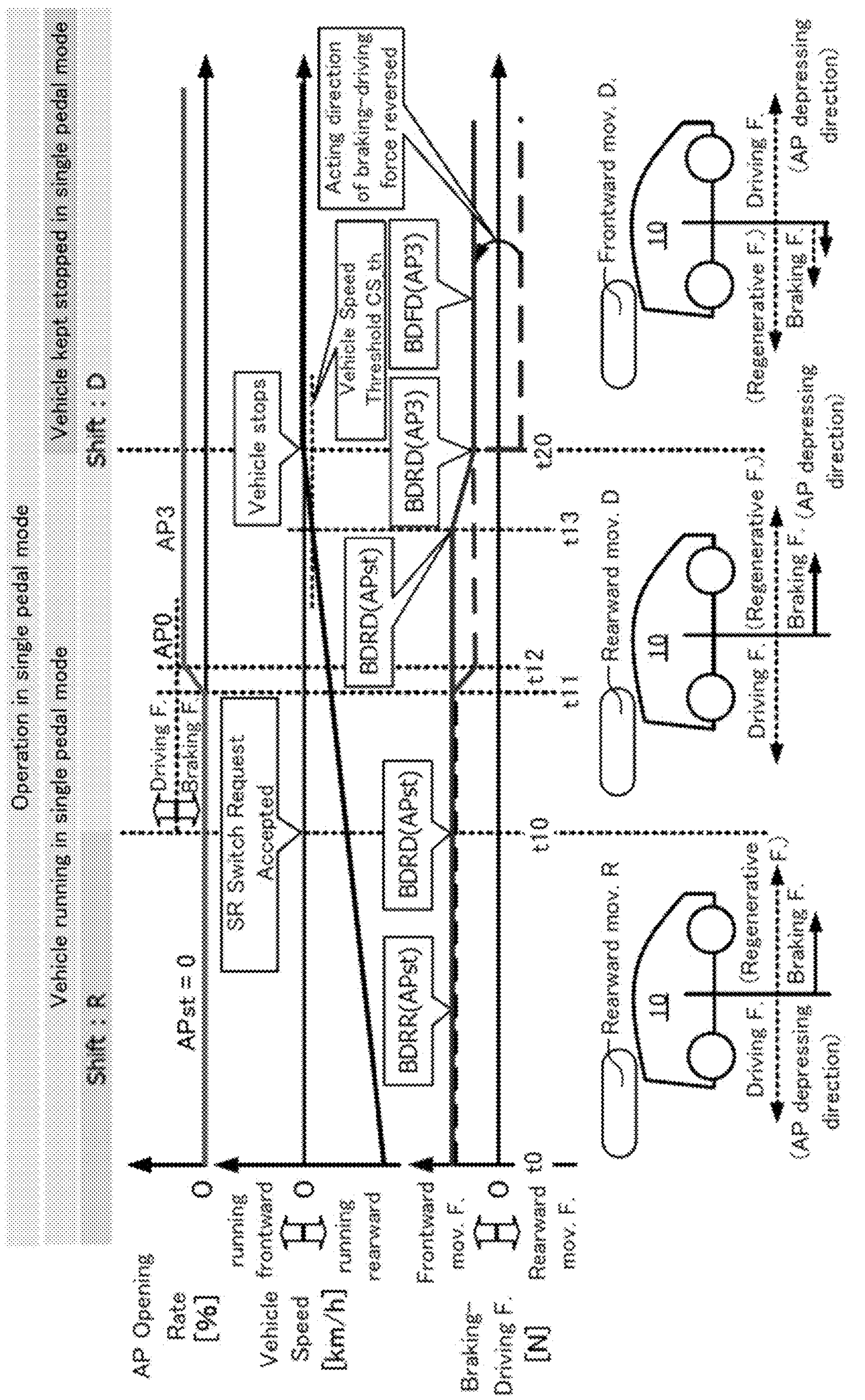
FIG. 4 is a time chart for describing the first basic operation of the vehicle running control device.
Figure 5:
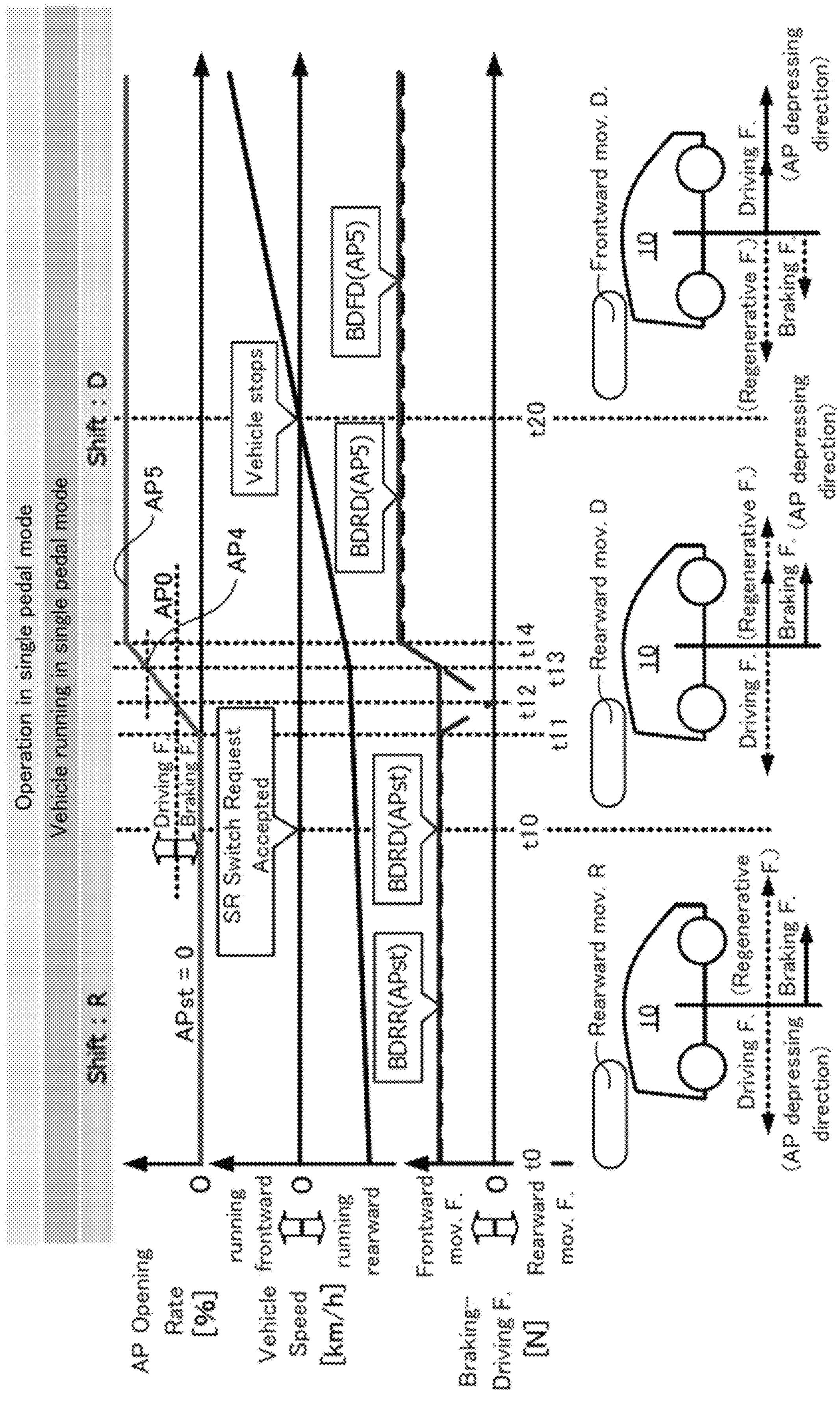
FIG. 5 is a time chart for describing a second basic operation of the vehicle running control device.

Next, first and second basic operations of the vehicle running control device 11 of the embodiment of the present invention are described with reference to FIG. 4 and FIG. 5. FIG. 4 is a time chart for describing the first basic operation of the vehicle running control device 11. FIG. 5 is a time chart for describing the second basic operation of the vehicle running control device 11.

Here, suppose that the vehicle 10 currently has the AP operation mode set to the single pedal mode and the deceleration level in the D range set to the "first level" when the shift range is switched from the R range to the D range according to the shift range switch request (SR switch request).

<First Basic Operation of the Vehicle Running Control Device 11>

To begin with, the first basic operation of the vehicle running operation 11 of the embodiment of the present invention is explained with reference to FIG. 4.

The vehicle 10 is running rearward in the second normal running mode (Rearward running+R: RR) with the shift position set at the R range (rearward running) during a time period between t0 and t10, as shown in FIG. 4.

During the time period between t0 and t10, the AP opening rate is zero (APst=0) and the vehicle speed decreases gradually. Accordingly, a braking-driving force BDRR(APst) (See FIG. 2B and FIG. 4) in accordance with the braking-driving request value (AP opening rate, APst=0) for the AP operation is applied to the vehicle 10.

The shift range switch request (SR switch request) is accepted at the time t10 as shown in FIG. 4. Then, the shift range is switched from the R range to the D range at the time t10. The switch-back operation to be described below is performed during a time period between t10 and t20.

The SR switch request from the R range to the D rage is accepted on the condition that the shift switch 35 has been switched to a D range from a R range and that the vehicle speed is equal to or lower than a predetermined value (for example, 8 km/h).

During a time period from t10 to t11, the AP opening rate is kept constant (APST=0) and the vehicle speed decreases gradually by a braking force being applied to the vehicle 10, as shown in FIG. 4. That is, a braking-driving force BDRD (APst) (See a solid line for the braking-driving force in FIG. 4), which is in accordance with a braking-driving request value (for AP opening rate, APst=0) at the time when the SR switch request is accepted, continues to be applied to the vehicle 10.

The braking-driving force BDRD(APst) in accordance with the braking-driving request at the time when the SR switch request is accepted is equal to the braking-driving force BDRR(APst) being applied to the vehicle 10 during the time period between t0 and t10, as shown in FIG. 4.

During the time period from t11 to t12, the AP opening rate increases to an AP opening rate AP3 that is smaller than AP0 (being an AP opening rate corresponding to a boundary value between the driving force and the braking force). Therefore, since the braking force continues to be applied to the vehicle 10, the vehicle speed continues to gradually decrease during the time period from t11 to t12.

During the time period from t11 to t12, the braking-driving force BDRD(APst) (See a solid line for the braking-driving force in FIG. 4), which is applied to the vehicle 10 at the time when the SR switch request is accepted, continues to be applied to the vehicle 10, because the braking-driving force (See a broken line for the braking-driving force shown in FIG. 4) in accordance with the braking-driving request value during the time period from t11 to t12 is smaller than the braking-driving force BDRD(APst) that is applied to the vehicle 10 at the time when the SR switch request is accepted.

The reason why the braking-driving force in accordance with the braking-driving request value (See a broken line in FIG. 4) decreases gradually during the time period from t11 to t12 is that the braking-driving force in accordance with the AP opening rate (AP3) on the vehicle 10 in the switch back state at the time t12 is on the first path extending through the braking-driving force value points of BDRD (APst)-BDRD(AP1)-BDRD(AP0) in the third braking-driving-force-versus-AP-opening rate characteristic as shown in FIG. 2B.

When the braking-driving force in accordance with the braking-driving request value (See a broken line in FIG. 4) becomes larger than the braking-driving force BDRD(APst) (See a solid line for the braking-driving force in FIG. 4) applied to the vehicle 10 at the time when the SR switch request is accepted, the braking-driving force in accordance with the braking-driving request value is applied to the vehicle 10.

As shown in FIG. 4, the AP opening rate is kept at AP3 during a time period from t12 to t13. During this time period from t12 to t13, the vehicle speed continues to gradually decrease, because the braking force continues to be applied to the vehicle 10.

That is, during the time period from t12 to t13, the braking-driving force BDRD(APst) (See the solid line for the braking-driving force in FIG. 4) in accordance with the braking-driving request at the time when the SR switch request is accepted continues to be applied to the vehicle 10.

After the time t13, the vehicle speed becomes lower than a threshold vehicle speed value CS_th, as shown in FIG. 4. Then, the braking-driving force applied to the vehicle 10 decreases gradually and linearly during a time period from t13 to t20 from the braking-driving force BDRD(APst) (See FIG. 2B and FIG. 4) applied to the vehicle 10 at the time of the SR switch request being accepted to the braking-driving force BDRD(AP3) (See FIG. 4) in accordance with the braking-driving request value (AP opening rate: AP3) for the AP operation.

Since the braking-driving force is gradually decreased when the vehicle 10 is stopping in a short time, the vehicle 10 is prevented from swinging back as soon as the vehicle 10 stops, which contributes to having passengers on the vehicle 10 feel comfortable.

The vehicle 10 stops at a time t20 as shown in FIG. 4. The AP opening rate continues to be kept at AP3 at the time t20.

After the time t20, the vehicle 10 is kept stopped with the vehicle speed equal to zero. Since the vehicle 10 stops at the time t20, the vehicle 10 is no longer in the switch-back state and the braking-driving force BDFD(AP3) (See a broken line for the braking-driving force in FIG. 4) in accordance with the braking-driving request value (AP opening rate: AP3) is reversed at the time t20 from a frontward driving force to a rearward driving force. The reason for this reversal is that the AP opening rate AP3 at and after the time t20 is smaller than the AP opening rate AP0 that is the boundary value between the frontward driving force and the rearward driving force and thus the braking-driving force corresponding to the AP opening rate AP3 becomes a rearward driving-force (See FIG. 2B).

The braking-driving force BDFD(AP3) (See the solid line for the braking-driving force in FIG. 4) applied to the vehicle 10 at and after the time t20 is a rearward driving force corresponding to a braking-driving force in accordance with the braking-driving request value (AP opening rate: AP3) for the AP operation. Then, a friction braking force is applied to the vehicle 10 and the vehicle 10 is kept stopped.

<Second Basic Operation of the Vehicle Running Control Device 11>

Next, a second basic operation of the vehicle running control device 11 is described with reference to FIG. 5, focusing on differences from the first basic operation.

The second basic operation of the vehicle running control device 11 for the time period from t0 to t10 is the same as the first basic operation of the vehicle running control device 11. Accordingly, the following description on the second basic operation of the vehicle running control device 11 focuses on the second basic operation after the time t10.

The switch-back operation as described below is carried out during a time period from t10 to t20.

The AP opening rate is kept at APst=0 during the time period from t10 to t11 as shown in FIG. 5. The vehicle speed gradually decreases, because a braking force is applied to the vehicle 10. That is, the braking-driving force BDRD(APst) (See a solid line for the braking-driving force in FIG. 5), which is in accordance with the braking-driving request when the SR switch request is accepted, is applied to the vehicle 10.

The braking-driving force BDRD(APst) which is applied to the vehicle 10 in accordance with the braking-driving request when the SR switch request is accepted is equal to the braking-driving force BDRR(APst) applied to the vehicle 10 during the time period from t0 to t10, as shown in FIG. 5.

During a time period from t11 to t12, the AP opening rate increases to AP0 (AP0>AP3). This AP opening rate (AP0) equals the AP opening rate corresponding to a boundary value between the driving force and the braking force (See FIG. 5). During the time period from t11 to t12, the AP opening rate does not exceed AP0 and the vehicle speed continues to decrease gradually, because the braking force continues to be applied to the vehicle 10.

That is, the braking-driving force BDRD(APst), which is in accordance with the braking-driving request when the SR switch request is accepted, continues to be applied to the vehicle 10 during the time period from t11 to t12 (See the solid line in FIG. 5). This is because the braking-driving force in accordance with the braking-driving request value (See a broken line in FIG. 5) during the time period from t11 to t12 does not become higher than the braking-driving force BDRD(APst) (See FIG. 2B and FIG. 5) that corresponds to the braking-driving force applied to the vehicle 10 when the SR switch request is accepted.

The braking-driving force in accordance with the braking-driving request value (See the broken line in FIG. 5) decrease during the time period from t11 to t12, because the AP opening rate (AP0) at the time t12 corresponds to a terminal point (AP0) of the first path through the braking-driving force points BDRD(APst)-BDRD(AP1)-BDRD (AP0) in the third braking-driving-force-versus-opening-rate characteristic line as shown in FIG. 2B.

If the braking-driving force in accordance with the braking-driving request value (See the broken line in FIG. 5) becomes higher than the braking-driving force BDRD(APst) (See the solid line for the braking-driving force in FIG. 4) in accordance with the braking-driving request when the SR switch request is accepted, the braking-driving force in accordance with the braking-driving request value is applied to the vehicle 10.

During a time period from t12 to t13 as shown in FIG. 5, the AP opening rate increases from AP0 to AP4 (AP4>AP0>Ap3). During the time period from t12 to t13, the vehicle speed gradually decreases, because the braking force continues to be applied to the vehicle 10.

That is, the braking-driving force BDRD(APst) (See the solid line for the braking-driving force in FIG. 5) in accordance with the braking-driving request when the SR switch request is accepted continues to be applied to the vehicle 10. This is because the braking-driving force in accordance with the braking-driving request value (See the solid line in FIG. 2B) does not become higher than the braking-driving force BDRD(APst) (See the dotted line in FIG. 2B) when the SR switch request is accepted.

During the time period from t12 to t13, the braking-driving force in accordance with the braking-driving request value gradually increases (See a broken line in FIG. 5), because the AP opening rate AP4 at the time t13 is on the second path continuing from the first path and extending through the braking-driving force points BDRD(AP0)-BDRD(AP2)-BDRD(APed) in the third braking-driving-force-versus-AP-opening-rate characteristic line as shown in FIG. 2B.

The braking-driving force in accordance with the braking-driving request for AP opening rate AP4 at the time t13 equals the braking-driving force BDRD(APst) when the SR switch request is accepted. During the time period from t12 to t13, the friction braking force to prevent the vehicle 10 from running rearward is gradually replaced by the regenerative braking force. As a result, the braking-driving force BDRD(AP4) in accordance with the braking-driving request for the AP opening rate AP4 at the time t13 is only of the regenerative braking force.

During a time period from t13 to t14 as shown in FIG. 5, the AP opening rate increases from AP4 to AP5 (AP5>AP4>AP0>AP3). The vehicle speed continues to gradually decrease during the time period from t13 to t14, because the braking force continues to be applied to the vehicle 10.

That is, during the time period from t13 to t14, the increasing braking-driving force from BDRD(AP4) to BDRD(AP5) (See the solid line for the braking-driving force in FIG. 5), which is in accordance with the braking-driving request for the AP opening rate for this time period, is applied to the vehicle 10 as the AP opening rate increases from AP4 to AP5.

During a time period from t14 to t20 as shown in FIG. 5, the AP opening rate is kept constant at AP5 and the vehicle speed continues to gradually decrease, because the regenerative braking force BDRD(AP5) (See the solid line for the braking-driving force in FIG. 5) continues to be applied to the vehicle 10.

The vehicle 10 stops at the time t20 as shown in FIG. 5 while the AP opening rate is still kept at AP5 at the time t20.

The vehicle speed gradually increases after the time t20. Since the vehicle 10 stops at the time t20, the braking-driving force BDFD(AP5) (regenerative braking force) in accordance with the braking-driving request value (AP opening rate: AP5) for the AP operation becomes a driving force after the time t20. This driving force drives the vehicle 10 frontward as shown in FIG. 5. This is because the braking-driving force corresponding to the AP opening rate AP5 after the time t20, which is higher than the AP opening rate AP0 corresponding to the boundary value between the driving force and the braking force, is the driving force.

<Modification Example of the Second Basic Operation of the Vehicle Running Control Device 11>

Next, a modification example of the second basic operation of the vehicle running control device 11 of the embodiment of the present invention is described with reference to FIG. 6, focusing on differences from the second basic operation as described.

Figure 6:
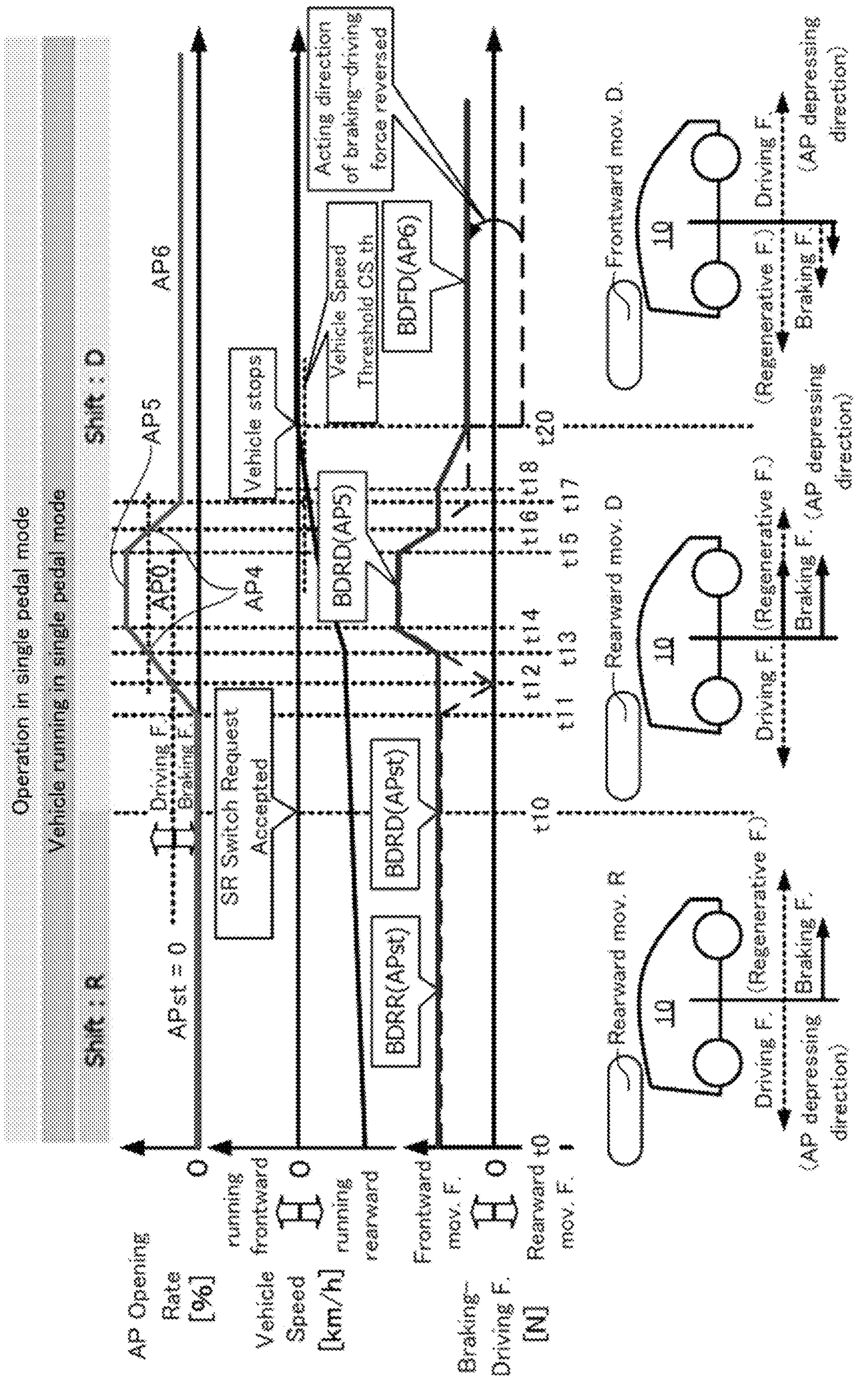
FIG. 6 is a time chart for describing a modification of the second basic operation of the vehicle running control device.

The modification example of the second basic operation of the vehicle running control device 11 as shown in FIG. 6 for the time period from t0 to t14 is the same as the second basic operation of the vehicle running control device 11 as shown in FIG. 5. Therefore, the modification example of the second basic operation of the vehicle running control device 11 is described, focusing on an operation after the time t14.

The switch-back operation as is to be described below is carried out during a time period from t10 to t20 as shown in FIG. 6.

The AP opening rate is kept constant at AP5 during a time period from t14 to t15. Since the regenerative braking force BDRD(AP5) (See a solid line for the braking-driving force in FIG. 6) is applied to the vehicle 10 during the time period from t14 to t15, the vehicle speed decreases gradually during this period.

The AP opening rate decreases from AP5 to AP6 (AP6<AP0<AP4<AP5) during a time period from t15 to t17. Since a braking force as is to be described below is applied to the vehicle 10 during the time period from t15 to t17, the vehicle speed gradually decreases.

The AP opening rate decreases from AP5 to AP4 (AP5>AP4>AP0>AP6) during a first time period from t15 to t16 of the time period from t15 to t17 as shown in FIG. 6. During this first time period from t15 to t16, the vehicle speed continues to gradually decrease. The braking-driving force applied to the vehicle 10 during this first period is in accordance with the braking-driving request for the AP opening rate and decreases from BDRD(AP5) to BDRD (AP4) that is equal to the braking-driving force BDRD (APst) when the SR switch request is accepted (See the solid line from BDRD(AP5) to BDRD(AP4) for the braking-driving force in FIG. 6), as the AP opening rate decreases from AP5 to AP4.

During a second time period from t16 to t17 of the time period from t16 to t17 as shown in FIG. 6, the AP opening rate decreases from AP4 to AP6 (AP6<AP0<AP4<AP5). The vehicle speed continues to gradually decrease during the second time period from t16 to t17. The braking-driving force BDRD(AP4) (See the solid line for the braking-driving force in FIG. 6), which is in accordance with the braking-driving request value for the AP opening rate: AP4 (for the AP operation) and is equal to BDRD(APst) that corresponds to the braking-driving force applied to the vehicle 10 when the SR switch request is accepted, is applied to the vehicle 10 as the minimum braking-driving force (BDRD(APst) =BDRD(AP4)) to be applied to the vehicle 10.

During the second time period from t16 to t17, the braking-driving force in accordance with the braking-driving request value for the AP opening rate decreases from the braking-driving BDRD(AP4) to the braking-driving force BDRD(AP6) (See the broken line in FIG. 6). During this time period, this decrease in the braking-driving force in accordance with the braking-driving request value is complemented by the friction braking force, which gradually increases during this period.

During a time period from t17 to t18 as shown in FIG. 6, the AP opening rate is kept constant at AP6. Since the braking-driving force BDRD(APst) applied to the vehicle 10 when the SR switch request is accepted continues to be applied to the vehicle 10 as the minimum braking-driving force (BDRD(APst)=BDRD(AP4)) to be applied to the vehicle 10 during this period, the vehicle speed gradually decreases.

The braking-driving force BDRD(AP4) (=BDRD(APst)) that is applied to the vehicle 10 during the time period from t17 to t18 is constituted by the friction braking force and the braking driving force BDRD(AP6) (See the broken line in FIG. 6), which is in accordance with the braking-driving request (AP opening rate: AP6) for the AP operation and works as a regenerative braking force.

The vehicle speed becomes lower than the threshold vehicle speed value CS_th at the time t18 as shown in FIG. 6. Then, during a time period from t18 to t20, the braking-driving force applied to the vehicle 10 decreases lineally and gradually from the minimum value that is the braking-driving force applied to the vehicle 10 when the SR switch request is accepted (BDRD(APst)=BDRD(AP4)) to the braking-driving force BDRD(AP6) (See FIG. 6) in accordance with the braking-driving request value (AP opening rate: AP6) for the AP operation. Since the AP opening rate is kept at AP6 during this time period, the decrease in the braking-driving force applied to the vehicle 10 corresponds to the decrease in the friction braking force applied to the vehicle 10.

When the vehicle 10 is stopping soon, decreasing gradually the braking-driving force on the vehicle 10 prevents the vehicle 10 from swinging back as soon as the vehicle 10 stops, which contributes to having a driver on the vehicle 10 feel comfortable.

The vehicle 10 stops at the time t20, and the AP opening rate is kept constant at AP6 after the time t20.

The vehicle 10 is kept stopped after the time t20 with the vehicle speed equal to zero. Since the vehicle 10 stops at the time t20, the vehicle 10 is no longer in the switch-back state and the braking-driving force BDFD(AP6) (See FIG. 6) in accordance with the braking-driving request value (AP opening rate: AP6) for the AP operation is reversed from a frontward driving force to a rearward driving force. Since the AP opening rate AP6 after the time t20 is smaller than the AP opening rate AP0 corresponding to the boundary value between the driving force and the braking force, the braking-driving force corresponding to the AP opening rate AP6 is a rearward driving force at and after the time t20.

The braking-driving force BDFD(AP6) that is actually applied to the vehicle 10 at and after the time t20 is a rearward driving force corresponding to a braking-driving force in accordance with the braking-driving request value (AP opening rate: AP6) for the AP operation. Accordingly, since a friction braking force, which has the same magnitude as that of BDFD(AP6), is applied to the vehicle 10, the vehicle 10 is kept stopped.

<Third Basic Operation of the Vehicle Running Control Device 11>

Next, a third basic operation of the vehicle running control device 11 of the embodiment of the present invention is described with reference to FIG. 7.

Figure 7:
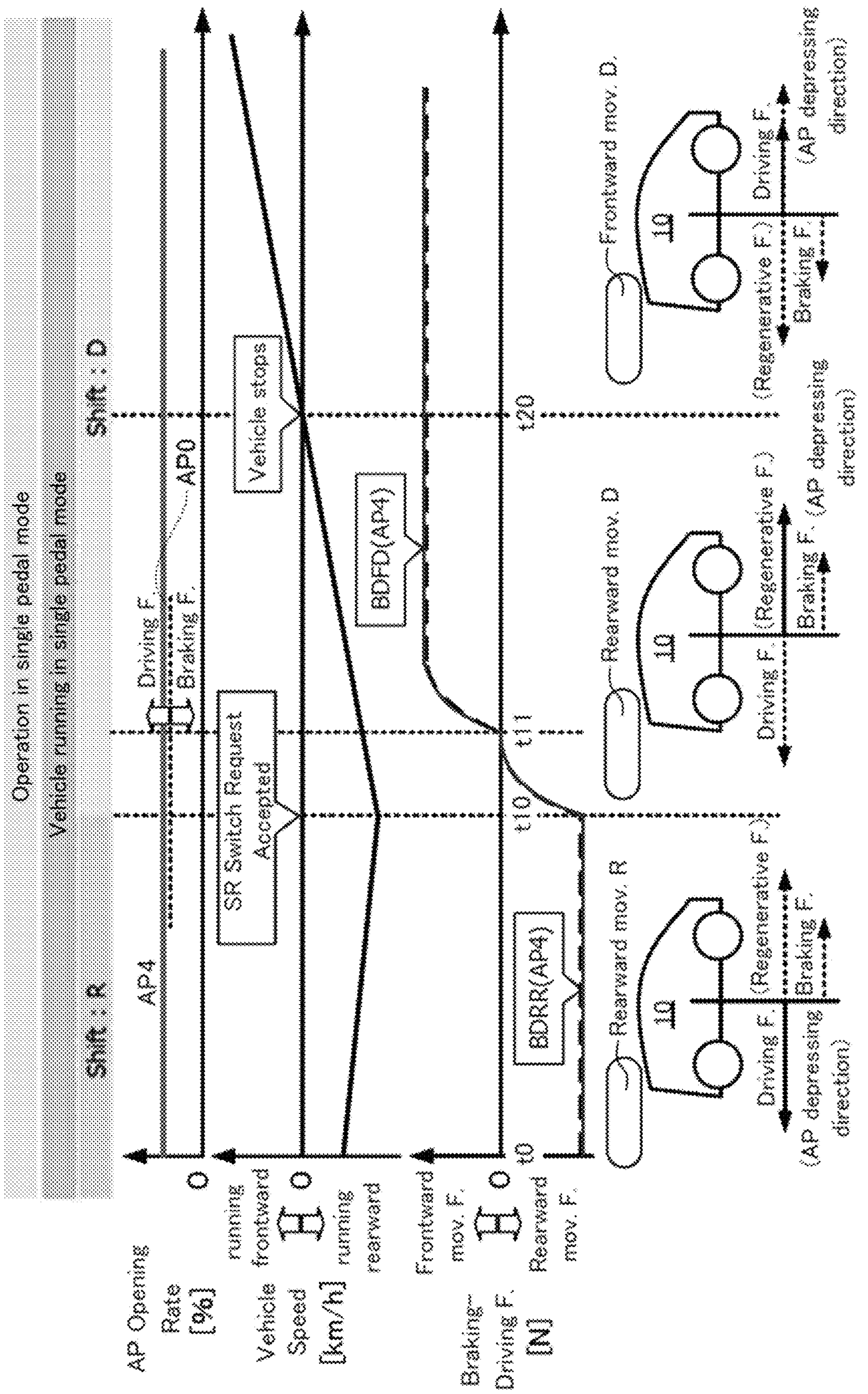
FIG. 7 is a time chart for describing a third basic operation of the vehicle running control device.

During a time period from t0 to t10, the vehicle 10 is running rearward in the second running mode in which the shift position is set at the R range (rearward driving) and the current running direction is a rearward direction, as shown in FIG. 7.

The AP opening rate for the time period from t0 to t10 is set at AP4 (AP4>AP0). Since a rearward driving force is applied to the vehicle 10, the vehicle speed gradually increases. That is, the braking-driving force BDRR(AP4) (See FIG. 7) that is in accordance with the braking-driving request value (AP operation rate: AP4) for the AP operation is applied to the vehicle 10.

At the time t10 as shown in FIG. 7, the shift switch request (SR switch request) from the R range to the D range is accepted. Then, the shift range is switched from the R range to the D range is accepted.

In this case, the braking-driving request value (AP opening rate: AP4) when the SR switch request is accepted is higher than the AP opening rate AP0 that is the boundary value between the driving force and the braking force and thus is out of the braking range. That is, the initial condition for starting the switch-back operation to cancel the switch-back state is not met in the third basic operation. As a result, the switch-back operation is not carried out in the third basic operation.

During the tine period from t10 to t11, the AP opening rate is kept constant at AP4 and the vehicle speed in the rearward direction gradually decreases during this time period, because there is a regenerative braking force on the vehicle 10 to counteract the vehicle 10 running rearward.

During a time period from t11 to t20, the AP opening rate is kept constant at AP4. Since the regenerative braking force BDFD(AP4), which counteracts the rearward running of the vehicle 10, is applied to the vehicle 10, the vehicle speed in the rearward direction decreases during the time period from t11 to t20 in the same way as during the time period from t10 to t11.

The vehicle 10 stops at the time t20 as shown in FIG. 7. The AP opening rate is kept constant at AP4 after the time t20.

Since a frontward driving force is applied to the vehicle 10 after the time t20, the vehicle speed increases gradually. This is because the braking-driving force corresponding to the AP opening rate AP4 is a driving force, because the AP opening rate after the time t20 is higher than the AP opening rate AP0 corresponding to the boundary value between the driving force and the braking force.

<Actions and Effects of the Vehicle Running Control Device 11 of the Embodiment of the Present Invention>

Next, actions and effects of the vehicle running control device 11 of the embodiment of the present invention are explained.

A vehicle running control device 11 of a first aspect of the present invention is provided with an accelerator pedal (accelerating-decelerating operation element) 21 that a driver operates when the driver inputs an acceleration-deceleration request to a vehicle inclusive of a driving request and a braking request, and has an operation range inclusive of a driving range and a braking range. This vehicle running control device comprises a processor including an input-output section (information receiving section) 61 receiving information on a current running direction in which the vehicle is currently running, information on a shift range switch request for switching a driving direction of the vehicle between frontward driving and rearward driving, and information on a braking-driving force applied to the vehicle, a state determining section (determining section) 72 determining whether the vehicle is in a switch-back state based on the current running direction of the vehicle and the target driving direction in accordance with the information on the shift range switch request to the vehicle in accordance with; and an acceleration-deceleration control section 73 controlling the vehicle running by applying a braking-driving force, wherein the state determining section (determining section) 72 keeps applying to the vehicle 10 a first braking-driving force that is applied to the vehicle when the shift range switch request is accepted if a braking-driving request value in accordance with an operation of the accelerator pedal (accelerating-decelerating operation element)

21 is in the braking range when the state determining section (determining section) 72 determines that the vehicle 10 is in the switch-back state, until the vehicle 10 stops.

According to the vehicle running control device 11 of the first aspect, the acceleration-deceleration control section 73 keeps applying to the vehicle 10 the braking-driving force applied to the vehicle 10 when the shift range switch request is accepted until the vehicle 10 stops, if the braking-driving request value in accordance with the operation of the accelerator pedal 21 is in the braking range when the state determining section 72 that the vehicle 10 is in the switch-back state Here, the case in which the braking-driving request value based on the operation of the accelerator pedal 21 is in the braking range when the vehicle 10 is determined to be in the switch-back state is presumed to be a case in which an inconsistent state is likely to be caused by "deceleration mismatch" between how far down the accelerator pedal 21 is depressed (AP accelerating-decelerating operation amount) and the accelerating-decelerating request value for the depressing operation of the accelerator pedal 21.

In the case like this, it is necessary to have a driver feel natural acceleration-and deceleration without having the driver feel odd with the vehicle running by preventing the "deceleration mismatch" if the vehicle is in the switch-back state.

According to the vehicle running control device 11 of the first aspect, the braking-driving force applied to the vehicle 10 when the shift range switch request is accepted is kept applied to the vehicle 10 until the vehicle 10 stops. As a result, the "deceleration mismatch" is prevented if the vehicle 10 is in the switch-back state, which ensures that a driver feels natural acceleration and deceleration without feeling odd with the vehicle 10.

A vehicle running control device 11 of a second aspect of the present invention may be in accordance with the vehicle running control device 11 of the first aspect, and have an additional feature of the vehicle running control device 11 having the acceleration-deceleration control section (running control section) 73 keep applying to the vehicle 10 a braking-driving force that is not lower than the first braking-driving force applied to the vehicle 10 when the shift range switch request is accepted, until the vehicle 10 stops, if the braking-driving request value for an operation of the accelerator pedal (braking-driving operation element) 21 is in the braking range when the state determining section (determining section) 73 determines that the vehicle is in the switch-back state, and performs running control of the vehicle 10 based on the first braking-driving force if a second braking-driving force that is in accordance with the braking-driving request value for the operation of the accelerator pedal 21 is lower than the first braking-driving force that is applied to the vehicle 10 when the shift range switch request is accepted and works as a minimum braking-driving force to be applied to the vehicle, and based on the second braking-driving force if the second braking-driving force that is in accordance with the braking-driving request value for the operation of the accelerator pedal 21 is higher than the first braking-driving force that works as the minimum braking-driving force to be applied to the vehicle 10.

The case in which the vehicle running control device 11 of the second aspect has the braking-driving request value for the operation of the accelerator pedal 21 that is in the braking range when the state determining section 73 determines that the vehicle is in the switch-back state is presumed to be a case where the "deceleration mismatch" is likely to occur and cause the inconsistent state, as has been described.

In addition, the case in which the second braking-driving force that is in accordance with the braking-driving request value for the operation of the accelerator pedal 21 is lower than the first braking-driving force that is the minimum braking-driving force to be applied to the vehicle 10 is presumed to be a case where the "deceleration mismatch" is likely to occur and cause the inconsistent state if the running control of the vehicle 10 is performed based on the second braking-driving force.

Furthermore, the case in which the second braking-driving force that is in accordance with the braking-driving request value for the operation of the accelerator pedal 21 is higher than the first braking-driving force that is the minimum braking-driving force to be applied to the vehicle is presumed to be a case where it is more advantageous to perform the running control of the vehicle 10 based on the second braking-driving force in order to prevent the "deceleration mismatch" that causes the inconsistent state.

Therefore, the vehicle running control device 11 of the second aspect applies to the vehicle 10 the braking-driving force that is not lower than the second braking-driving force applied to the vehicle 10 when the shift range switch request is accepted until the vehicle 10 stops, if the braking-driving request value is in the braking range when the vehicle 10 is determined to be in the switch-back state, and performs running control of the vehicle 10 based on the first braking-driving force applied to the vehicle 10 as the minimum driving-braking force to be applied to the vehicle when the shift range switch request is accepted if the second braking-driving force in accordance with the braking-driving request value for the operation of the accelerator pedal 21, and based on the second braking-driving force if the second braking-driving force is higher than the first braking-driving force.

The vehicle running control device 11 of the second aspect, in principle, applies to the vehicle 10 a braking-driving force which is not lower than the first braking-driving force applied to the vehicle 10 when the shift range request is accepted, until the vehicle 10 stops, and performs the running control of the vehicle 10 based on the second braking-driving force which is in accordance with the braking-driving request value for the operation of the accelerator pedal 21 if the second braking-driving force is higher than the first braking-driving force. As a result, the effect of preventing the "deceleration mismatch" to have a driver feel natural acceleration and deceleration without having the driver feel odd with the vehicle when the vehicle is in the switch-back state is further enhanced by the vehicle running control device 11 of the second aspect, compared with the vehicle running control device 11 of the first aspect.

A vehicle running control device 11 of a third aspect of the present invention is in accordance with the vehicle running control device 11 of the first aspect or the second aspect, and has an additional feature of the input-output section (information receiving section) 61 receiving information on a vehicle speed of the vehicle 10 as well, and the acceleration-deceleration control section (running control section) 73 gradually decreasing the first braking-driving force applied to the vehicle 10 when the shift range switch request is accepted, during a period from when vehicle speed received by the information receiving section 61 becomes lower than a predetermined threshold vehicle speed value CS_th to when the vehicle speed becomes zero.

According to the vehicle running control device 11 of the third aspect, the acceleration-deceleration control section 73 gradually decreases the braking-driving second braking-driving force applied to the vehicle when the shift range switch request is accepted from when vehicle speed received by the information receiving section becomes lower than a predetermined threshold vehicle speed value to when the vehicle speed becomes zero. As a result, the vehicle running control device 11 of the third aspect has an advantageous effect of preventing the vehicle 10 from swing back as soon as the vehicle 10 stops, which contributes to having a driver on the vehicle 10 feel comfortable, in addition to the advantageous effects of the vehicle running control device 11 of the first aspect or the second aspect.

A vehicle running control device 11 of a fourth aspect of the present invention is in accordance with the vehicle running control device 11 of any of the first aspect to the third aspect, and has an additional feature of the acceleration-deceleration control section (running control section) 73 replaces with a regenerative braking force a friction braking force that is applied to the vehicle as the braking-driving force that the running control section applies to the vehicle and equivalent to the braking-driving force in accordance with the braking-driving request value for the operation of the accelerator pedal (accelerating-decelerating operation element) 21, if the braking-driving request value for the operation of the accelerating-decelerating operation element increases into the driving range, while the braking-driving force applied to the vehicle is kept at the first braking-driving force applied to the vehicle when the shift range switch request is accepted.

According to the vehicle running control device 11 of the fourth aspect, the acceleration-deceleration control section 73 replaces a friction braking force that is applied to the vehicle with a regenerative braking force, if the braking-driving request value for the operation of the accelerator pedal (accelerating-decelerating operation element) 21 increases into the driving range while the first braking-driving force applied to the vehicle when the shift range switch request is accepted is being applied to the vehicle in the switch-back state. As a result, an acceleration disrupting phenomenon to disrupt smooth acceleration of the vehicle when a driver starts to accelerate, which can occur if the friction braking force is applied to the vehicle 10 when the switch-back state ends, is prevented, which contributes to having the driver feel that the vehicle is accelerating and decelerating naturally without having the driver feeling odd with the vehicle.

A vehicle running control device 11 of a fifth aspect of the present invention is in accordance with the vehicle running control device 11 of the fourth aspect, and has an additional feature of the acceleration-deceleration control section (running control section) 73 replaces with the friction braking force the regenerative braking force that has once replaced the friction braking force and is equivalent to a difference between the braking-driving force being applied to the vehicle and the regenerative braking force in accordance with the braking-driving request value for the operation of the accelerating-decelerating operation element (accelerating-decelerating operation element) 21, when the braking-driving request value for the operation of the accelerator pedal (acceleration-deceleration control element) 21 decreases back into the braking range after increasing from the braking range into the driving range.

According to the vehicle running control device 11 of the fifth aspect, the acceleration-deceleration control section 73 replaces with a friction braking force the regenerative braking force that has once replaced the friction braking force and is equivalent to a difference between the first braking-driving force that is applied to the vehicle when the shift range switch request is accepted and the regenerative braking force for the braking-driving request value for the operation of the accelerator pedal 21, when the braking-driving request value for the operation of the accelerator pedal 21 decreases back into the braking range after increasing from the braking range into the driving range. As a result, even if the braking-driving request value in accordance with the operation of the accelerator pedal 21 decreases back into the braking range after the braking-driving force that is applied to the vehicle and kept at the first braking-driving force applied to the vehicle when the shift range switch request is accepted is replaced by the regenerative braking force, there remains a regenerative braking force for the braking-driving request value for the operation of the accelerator pedal 21 that is applied to the vehicle 10 and the difference between the this regenerative braking force and the first braking-driving force is complemented by a friction braking force. Accordingly, there remains an effect of the braking-driving force (regenerative braking force) for the operation of the accelerator pedal 21.

A vehicle running control device 11 of a sixth aspect of the present invention is in accordance with the vehicle running control device 11 of any of the first aspect to fifth aspect, and has an additional feature of the acceleration-deceleration control section (deceleration control section) 73 prohibits the braking-driving force applied to the vehicle from being kept at the first braking-driving force if the braking-driving request value for the operation of the accelerator pedal (accelerating-decelerating operation element) 21 is out of the braking range when the state determining section (determining section) 72 determines that the vehicle is in the switch-back state.

The vehicle running control device 11 of the sixth aspect assumes that the case in which the braking-driving request value for the operation of the accelerator pedal 21 is out of the braking range when the state determining section 72 determines that the vehicle is in the switch-back state is a case in which the inconsistent state caused by the phenomenon of the deceleration mismatch as has been described is unlikely to occur.

In the case like this, there is no need to take into consideration the phenomenon of the deceleration mismatch to cancel the switch-back state.

According to the vehicle running control device 11 of the sixth aspect, the braking-driving force applied to the vehicle when the shift range switch request is accepted is prohibited from being kept applied to the vehicle when there is no need to take into consideration the phenomenon of the deceleration mismatch to cancel the switch-back state. As a result, the vehicle running can be controlled based on the braking-driving force in accordance with driver's intension, which contributes to the driver feeling a fun to drive.

Other Embodiments

Since the embodiments as have been described are exemplary embodiments of the present invention, the technical scope of the present invention should not be interpreted to be limited by these embodiments. Obviously, there are various other embodiments within the technical scope of the present invention.

For instance, the vehicle running control device 11 of the embodiments of the present invention as have been described are assumed to be applied to an electric vehicle having only a motor generator 49 as a driving source (without an internal combustion engine mounted). However, the present invention is not limited to these embodiments and obviously can be applied to a hybrid vehicle to which both an internal combustion engine and a motor generator 49 as driving sources.

What is claimed is:

1. A vehicle running control device provided with an accelerating-decelerating operation element that a driver operates when the driver inputs an acceleration-deceleration request to a vehicle inclusive of a driving request and a braking request, and has an operation range inclusive of a driving range and a braking range, the vehicle running control device comprising a processor including:

an information receiving section configured to receive information on a current running direction in which the vehicle is currently running, information on a shift range switch request for switching a driving direction of the vehicle between frontward driving and rearward driving, information on a braking-driving force applied to the vehicle, and information on a vehicle speed of the vehicle;

a determining section configured to determine whether the vehicle is in a switch-back state in which there is a discrepancy between the current running direction of the vehicle and a target driving direction of the vehicle in accordance with the information on the shift range switch request; and a running control section configured to perform running control of the vehicle running by applying a braking-driving force to the vehicle, wherein in response to a braking-driving request value for an operation of the accelerating-decelerating operation element being in the braking range when the determining section determines that the vehicle is in the switch-back state, the running control section is configured to:

keep the braking-driving force applied to the vehicle at a first braking-driving force that is applied to the vehicle when the shift range switch request is accepted until the vehicle speed received by the information receiving section becomes lower than a predetermined threshold vehicle speed value; and gradually decrease the braking-driving force being applied to the vehicle that is the first braking-driving force during a period from when the vehicle speed received by the information receiving section becomes lower than the predetermined threshold vehicle speed value to when the vehicle speed becomes zero.

2. The vehicle running control device as claimed in claim 1, wherein the running control section keeps applying to the vehicle the braking-driving force not lower than the first braking-driving force applied to the vehicle when the shift range switch request is accepted, until the vehicle stops, if the braking-driving request value for the operation of the braking-driving operation element is in the braking range when the determining section determines that the vehicle is in the switch-back state, and performs running control of the vehicle, based on the first braking-driving force if a second braking-driving force that is in accordance with the braking-driving request value which the information receiving section receives is lower than the first braking-driving force that is applied to the vehicle when the shift range switch request is accepted and based on the second braking-driving force if the second driving force is higher than the first braking-driving force.

3. The vehicle running control device as claimed in claim 1, wherein in response to the braking-driving request value for the operation of the accelerating-decelerating operation element increasing into the driving range while the braking-driving force applied to the vehicle is kept at the first braking-driving force, the running control section is configured to replace with a regenerative braking force a friction braking force that is applied to the vehicle as the braking-driving force that is applied to the vehicle by the running control section and is equivalent to the braking-driving force in accordance with the braking-driving request value for the operation of the accelerating-decelerating operation element.

4. The vehicle running control device as claimed in claim 3, wherein in response to the braking-driving request value for the operation of the accelerating-decelerating operation element decreasing back into the braking range after increasing from the braking range into the driving range during the same switch-back state, the running control section replaces with a friction braking force the regenerative braking force by an amount that is equivalent to a difference between the braking-driving force being applied to the vehicle and the regenerative braking force in accordance with the braking-driving request value for the operation of the accelerating-decelerating operation element.

5. The vehicle running control device as claimed in claim 1, wherein the running control section prohibits the braking-driving force applied to the vehicle from being kept at the first braking-driving force if the braking-driving request value for the operation of the accelerating-decelerating operation element is out of the braking range when the determining section determines that the vehicle is in the switch-back state.

* * * * *